UNITED STATES PATENT OFFICE.

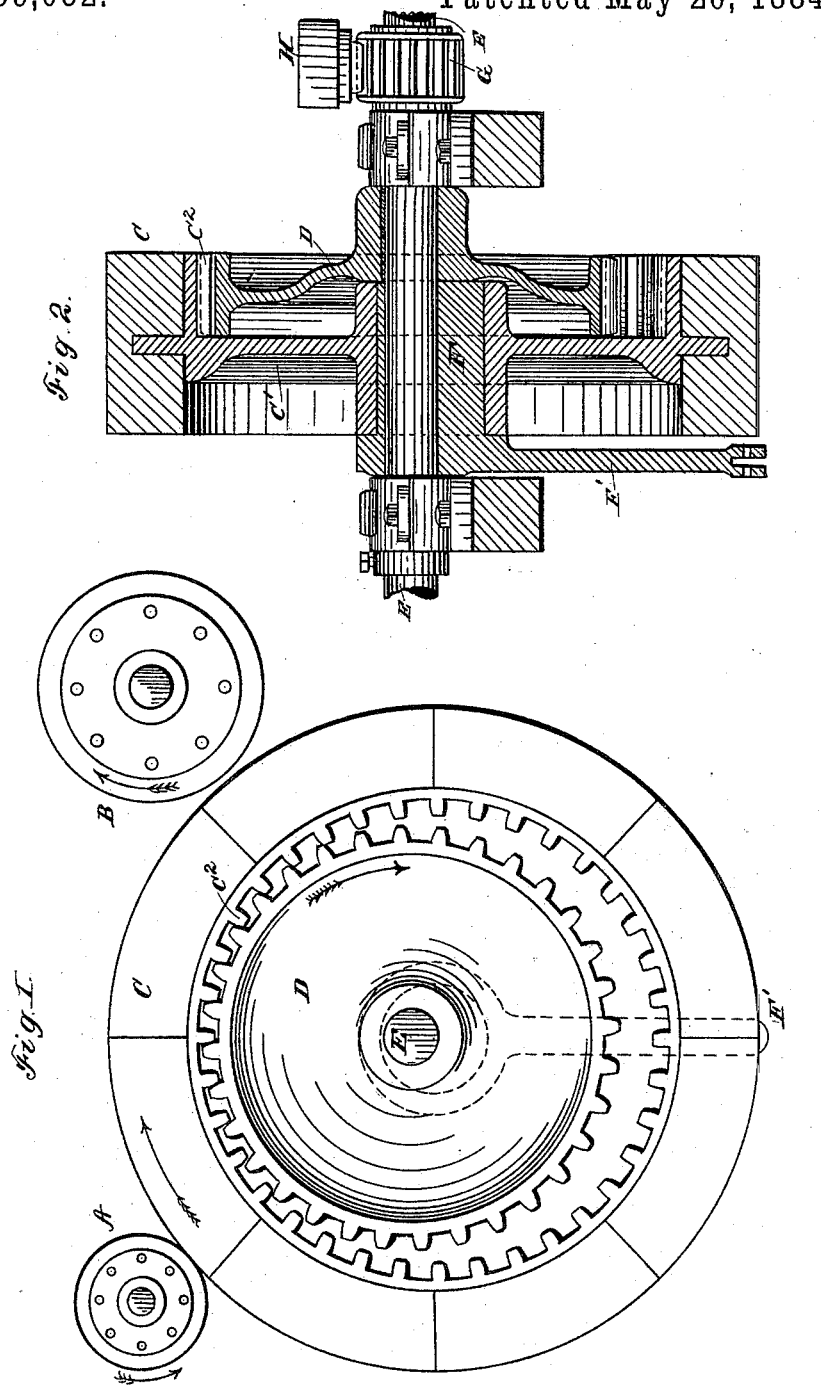

JOHN McEWEN, OF WELLSVILLE, NEW YORK.

MECHANICAL MOVEMENT.

SPECIFICATION forming part of Letters Patent No. 299,082, dated May 20, 1884.

Application filed April 17, 1884. (No model.)

*To all whom it may concern:*

Be it known that I, JOHN MCEWEN, a citizen of the United States, residing at Wellsville, in the county of Allegany and State of New York, have invented certain new and useful Improvements in Mechanical Movements; and I do hereby declare the following to be a full, clear, and exact description of the invention, such as will enable others skilled in the art to which it appertains to make and use the same.

This invention consists in providing a new mechanical movement, or, more particularly, a new and improved reversing friction-gear.

The purpose of the device is to provide a gearing for giving rotative motion to a shaft which is mounted in fixed bearings or journals from either of two oppositely-rotating shafts, which are also mounted in fixed bearings or journals. The most common applications of such a gearing will be in the feed and gig movement of saw-mill carriages and the reversing-gears of hoisting apparatuses, elevators, and winches of various kinds. In friction-gearing for these purposes either the shaft which is to be rotated in opposite directions is made movable at one or both of its journals, or else the two oppositely-rotating shafts are each made movable at their bearings, so that the friction-gear on the driven shaft can be impinged upon either of the driving-gears, or else so that either of the driving-gears may be impinged upon the driven gear. In my device all the shafts are mounted in fixed bearings, and the driven friction-gear is made movable upon the driven shaft, so that it can be thrown into gearing with either of the driving-gears.

My device is illustrated in the accompanying drawings as follows:

Figure 1 is a side elevation of my device. Fig. 2 is a vertical sectional view through the driven gear, the shaft being left in elevation. In this figure the rack and pinion or "rag-wheel" of a saw-mill-carriage movement is shown in connection.

A and B are the two driving-gears, C is the driven gear, and E is the driven shaft. D is a gear or pinion fixed upon the shaft E. F is an eccentric sleeve mounted loosely on the shaft E, and having an arm, F', by which it can be moved upon said shaft rotatively. The driven gear or friction C is mounted loosely on this eccentric sleeve, and hence is eccentric to and free of the shaft E. $C^2$ is a flange or rim on the web C' of the pulley C, and is provided with cogs internally, which mesh with the cogs on the pinion D, which is keyed to and is concentric with the shaft E. It is by these cogs that motion is communicated from the friction-gear C to the shaft E.

By observing Fig. 1 it will be seen that the friction-gear C is in contact with the driving-friction A, and that if the arm F' is moved to the right the contact of these gears will cease, and if it is moved far enough to the right the gear C will be put in contact with the oppositely-rotating gear B, and the direction of movement of the shaft E will be reversed. In thus moving the gear C no movement of the shaft E has occurred. The whole movement has been effected by the rolling of the eccentrically-mounted sleeve F, on which the gear C is mounted.

Of course it should be understood that if the shaft E were a driven shaft my device could be used to communicate power to either of the gears A or B, as desired. Such a use would not be a reversing-gear in itself; but it could be made so by crossing one of the belts running from the shafts A and B.

I do not wish to be limited to the uses herein mentioned, for my device may be employed in a great variety of mechanisms.

What I claim as new is—

A mechanical movement consisting of the combination, substantially as shown, of the following elements: three shafts having fixed bearings and provided with proper gears, such as A, B, and D, an eccentric sleeve loosely mounted, so as to be rolled upon the intermediate shaft, and an intermediate communicating gear mounted loosely on said eccentric sleeve, and adapted, as shown, to be always in gear with the gear on the intermediate shaft, and to be thrown into gear with either of the gears on the other shafts by properly moving the said sleeve on the intermediate shaft.

In testimony whereof I affix my signature in presence of two witnesses.

JOHN McEWEN.

Witnesses:
FRANK H. ARNOLD,
ALBERT GRETHER.